United States Patent [19]

Hubler

[11] Patent Number: 5,160,157
[45] Date of Patent: Nov. 3, 1992

[54] FIFTH WHEEL TRAILER HITCH APPARATUS

[76] Inventor: Frank J. Hubler, 121 - 6338 Vedder Road, Sardis, British Columbia, Canada, V2R 1C6

[21] Appl. No.: 662,181

[22] Filed: Feb. 28, 1991

[51] Int. Cl.$^5$ .............................................. B62D 53/04
[52] U.S. Cl. ................................. 280/423.1; 280/495; 280/901
[58] Field of Search ................. 280/423, 901, 415.1, 280/495

[56] References Cited

U.S. PATENT DOCUMENTS

| | | | |
|---|---|---|---|
| 2,212,081 | 8/1940 | Spires | 280/423.1 |
| 3,383,119 | 5/1968 | Carroll | 289/426 |
| 3,392,992 | 7/1968 | Baker | 280/423.1 |
| 3,722,917 | 3/1973 | Mims et al. | 280/423.1 |
| 3,756,624 | 9/1973 | Taylor | 280/423.1 |
| 3,770,297 | 11/1973 | Quick | 280/423.1 |
| 3,790,189 | 2/1974 | Winter | 280/423.1 |
| 3,797,862 | 3/1974 | Letterman | 280/423.1 |
| 3,801,135 | 4/1974 | Winter | 280/423.1 |
| 3,807,763 | 4/1974 | Knott | 280/423.1 |
| 3,825,281 | 7/1974 | Howard | 280/423.1 |
| 3,870,341 | 3/1975 | Younger | 280/423.1 |
| 3,881,750 | 5/1975 | Shatto | 280/423.1 |
| 3,887,220 | 6/1975 | Hall | 280/423.1 |
| 4,256,323 | 3/1981 | McBride | 280/423.1 |

*Primary Examiner*—Mitchell J. Hill
*Attorney, Agent, or Firm*—Bull, Housser & Tupper

[57] ABSTRACT

A fifth wheel trailer hitch apparatus includes a support attachable to the trunk compartment, a platform connected to and supported by the support, a hitch ball mechanism, including a hitch ball attached to an extension member which is slideably communicating with the platform for movement of the mechanism between a retracted, lower position and extended, raised position, extended and retracted position securing devices to secure the mechanism in the extended and retracted positions respectively, and a coupling device for coupling the coupling mechanism of the trailer to the hitch ball. A coupler device includes an annular collar split into two portions, the collar being mateable with an intermediate narrow protrusion portion of a fifth wheel male end, a coupler with a tubular end for encircling a portion of the annular collar and an opposed ball end with an inner side forming a zone of a sphere for mating with a portion of a first hemisphere of a hitch ball collar attachment for attaching the collar to the tubular end of the coupler to sandwich the annular ring portion between the collar and the tubular end, an annular ring member with an inner side forming a zone of a sphere for mating with a portion of a second hemisphere of the hitch ball and a ring attaching device for attaching the annular ring member to the ball to sandwich the ball between the ring member and the ball end to permit the ball to rotate therebetween.

34 Claims, 9 Drawing Sheets

FIFTH WHEEL TRAILER HITCH APPARATUS

BACKGROUND OF THE INVENTION

This invention relates to a fifth wheel coupling device for coupling a fifth wheel trailer male end to a conventional trailer hitch ball and further to an apparatus for coupling a fifth wheel trailer hitch male end to a trailer hitch ball located in the trunk compartment of a motor vehicle.

A fifth wheel trailer hitch mechanism is a popular means of rotatably connecting a trailer to a motor vehicle. These trailers are commonly used with pickup trucks, wherein the fifth wheel plate is pivotally mounted in the truck bed and a fifth wheel male end is mounted to a beam extending from the trailer. Such a conventional fifth wheel trailer hitch mechanism is shown in U.S. Pat. No. 3,392,992 to Baker et al. The Baker patent discloses a fifth wheel-type trailer having an extension beam which is mounted to a fifth wheel plate in the truck bed by means of a fifth wheel male end.

In touring with a trailer, it is often desirable to use an automobile as the towing vehicle, rather than a pickup truck. An automobile permits more passengers to be carried by the towing vehicle and also provides an enclosed trunk compartment for carrying luggage. As well, many individuals prefer to own an automobile in preference to a pickup truck and only have an automobile available to tow a trailer.

In the past, trailers have been connected to automobiles by using a standard ball hitch-type coupling system attached to the rear bumper of the automobile. A fifth wheel type trailer could not be properly attached to a ball hitch-type coupling system without some modification, as the fifth wheel male end of the trailer is generally too high to be properly coupled at the level of the automobile bumper. One method of solving this problem and thereby coupling a fifth wheel-type trailer to an automobile is to provide a support system in or adjacent the trunk of the automobile and to couple the fifth wheel male end of the trailer to the support system.

Several coupling systems have been devised to couple a fifth wheel type trailer to a support system in the trunk compartment of an automobile. This permits an automobile to be used to tow a fifth wheel-type trailer. Such a coupling system serves at least two purposes. Firstly, such a system generally provides for coupling in a position which is raised from the floor of the trunk compartment and couples the trailer to the automobile at the proper level for towing the trailer in a suitable horizontal orientation. This raised position also permits the trailer to pivot with respect to the automobile without interference with the rear of the automobile. Secondly, the positioning of the coupling system in or adjacent the trunk compartment moves the weight of the trailer on the rear of the automobile to a position closer to the rear axle of the automobile, which improves the load bearing capabilities of the automobile.

Examples of coupling mechanisms used to couple an automobile to a fifth wheel type trailer are disclosed in U.S. Pat. No. 3,801,1352 to Winter and also in U.S. Pat. No. 4,256,3232 to McBride. These apparatuses generally provided a rigid frame assembly having a means for coupling a fifth wheel type trailer to a corresponding mating end attached to the trunk compartment of the passenger motor vehicle. There are several difficulties with these types of coupling mechanisms. Firstly, as seen in McBride, if the trunk lid is to enclose the trunk, the coupling mechanism must be positioned above the trunk lid for proper clearance between the trailer and the rear deck of the motor vehicle. This relatively high orientation of the coupling means causes instability as the coupling mechanism (and the weight of the trailer thereon) is at a relatively high centre of gravity compared to the motor vehicle. In Winter the centre of gravity of the coupling mechanism is lower than McBride, being in the trunk compartment of the vehicle. However, in Winter, in order to accommodate this lower centre of gravity for the coupling mechanism, the trunk lid must be completely removed from the vehicle and is attached to the underside of the forward extension portion of the trailer. Consequently, with the Winter apparatus the entire trunk compartment is open to the elements in order to permit coupling and proper clearance of the coupler and trailer extension beam for normal pivotal movement of the trailer, relative to the motor vehicle.

Consequently, there is a need for a fifth wheel trailer coupling mechanism which may be attached to the trunk compartment of a motor vehicle, without removal of the trunk lid, through a relatively small opening in the trunk lid. Furthermore, there is a need for a coupler device to couple a fifth wheel type trailer to the coupling mechanism in the trunk compartment which may fit through the opening and permit rotation of the trailer, relative to the motor vehicle. There is also a need for a coupling mechanism having a portion which may be raised from the trunk compartment through the opening to an area above the trunk lid to enable the user to couple the coupler device to the trailer with the trunk lid closed and which portion may be lowered into the trunk compartment through the opening for positioning within the trunk compartment when the trailer is towed to lower the centre of gravity of the coupler device to facilitate more stable and secure towing of the trailer. As well, there is a need for a sealable cap to be positioned about the trunk lid opening when the trailer is coupled to the automobile to prevent rain water and other foreign matter from entering the trunk compartment when the trailer is coupled to the automobile. There is also a need for a sealable cap to be positioned in and cover the trunk lid opening when the trailer has been detached from the motor vehicle to prevent foreign materials such as rain water from entering the trunk compartment through the opening.

SUMMARY OF THE INVENTION

The present invention provides a fifth wheel trailer hitch apparatus for attaching a coupling mechanism of a fifth wheel type trailer to the trunk compartment of passenger-type motor vehicle, the motor vehicle having a trunk lid to enclose the trunk compartment and an opening through the trunk lid. The hinge apparatus includes a support attached to the trunk compartment, a platform connected to and supported by the support, a hitch ball mechanism, extended position securing means, retracted position securing means and a coupling means for coupling the coupling mechanism of the trailer to the hitch ball. The hitch ball mechanism includes a hitch ball attached to an extension member which slideably communicates with the platform for movement of the mechanism between a retracted, lower position and an extended raised position. The hitch ball is positionable below the trunk when in the retracted position and positionable above the trunk lid, and extending through the opening, when in the extended position. The apparatus may also include the biasing means for biasing the mechanism to the extended position. The coupling means may include a coupler securable to the fifth wheel coupling mechanism having and outwardly extending conduit with an inner spherical face forming a zone of a sphere for mating with a portion of the first hemisphere of the hitch ball and a ring member connected to the hitch ball having an inner spherical face forming a zone of a sphere for mating with a portion of a second hemisphere of the hitch ball. The ring member is attachable to the coupler to sandwich the ball between the ring member and the coupler to permit the hitch ball to rotate therebetween.

The extended position securing means may be an extendable pin connected to the platform with a corresponding extended position slot in the extension member for receiving the pin when the mechanism is in the extended position. The retracted position securing means may be a retracted position slot in the extension member for receiving the extendable pin when the mechanism is in the retracted position. Optionally, the pin may be biased toward the slot. As well, a pin engaging means may be provided to engage the pin against the bias of the biasing means when the pin has been moved a predetermined distance from the slot. The apparatus may also include pin actuating means for disengaging the pin engaging means to permit the pin biasing means to bias the pin towards the slot.

The present invention also provides an apparatus for coupling a fifth wheel male end to a trailer hitch ball, the male end having an intermediate narrow protrusion portion with an annular ring portion extending laterally therefrom. The apparatus includes an annular collar split into two portions. The collar is matable with the intermediate narrow protrusion portion adjacent the annular ring portion. A coupler has a tubular end for encircling a portion of the annular collar and an opposed ball end with an inner side forming a zone of a sphere for mating with a portion of a first hemisphere of the ball. Collar attaching means are provided for attaching the collar to the tubular end of the coupler thereby sandwiching the annular ring portion between the collar and the tubular end. An annular ring member has an inner side forming a zone of a sphere for mating with a portion of a second hemisphere of the ball. Ring attaching means are provided for attaching the annular ring member to the ball and thereby sandwiching the ball between the ring member and the ball end, permitting the ball to rotate therebetween.

DETAILED DESCRIPTION OF THE INVENTION

Figure 1:
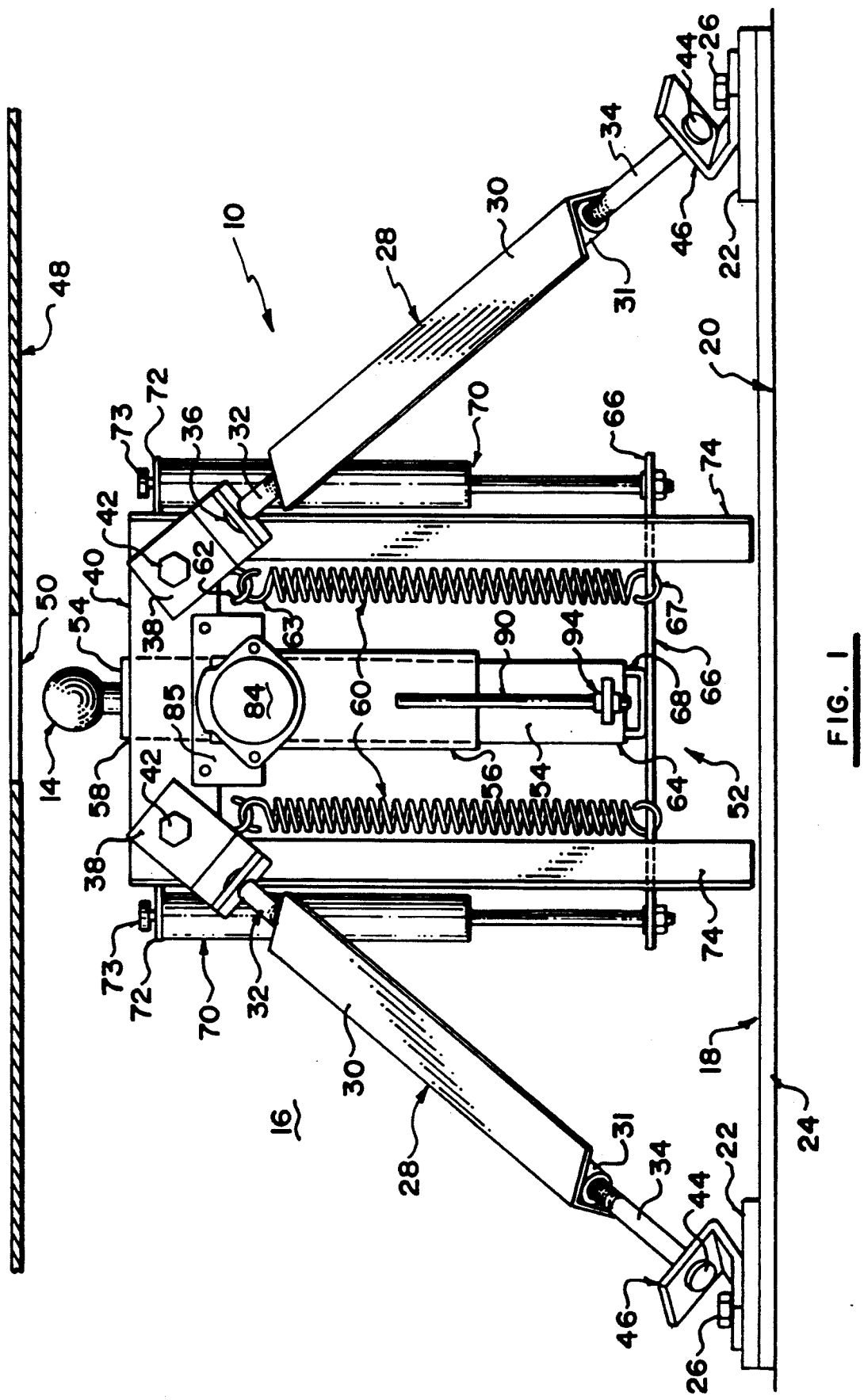
FIG. 1 is a side elevation of the fifth wheel mounting means in the trunk compartment of a passenger motor vehicle, in the lowered position.
Figure 6:
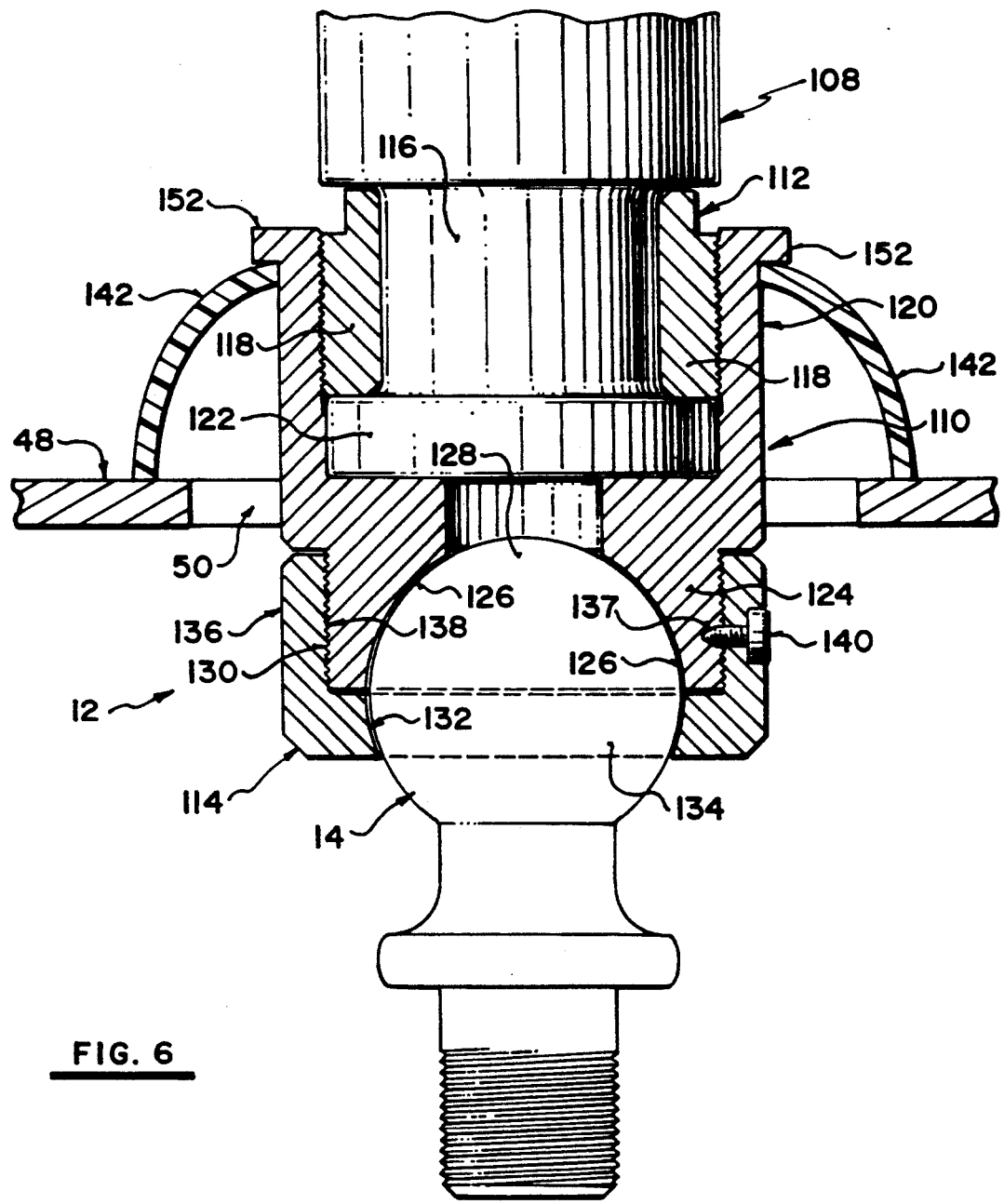
FIG. 6 is a close-up cross sectional view of the coupler device shown with a portion of the male end of a fifth wheel trailer and a conventional hitch ball.

A fifth wheel trailer hitch apparatus is made up of two components; a trunk support apparatus, shown generally at 10 in FIG. 1 and coupling means shown generally at 12 in FIG. 6. Coupling means 12 couples the male end coupling mechanism of a fifth wheel type trailer to hitch ball 14 of trunk support apparatus 10.

Figure 5:
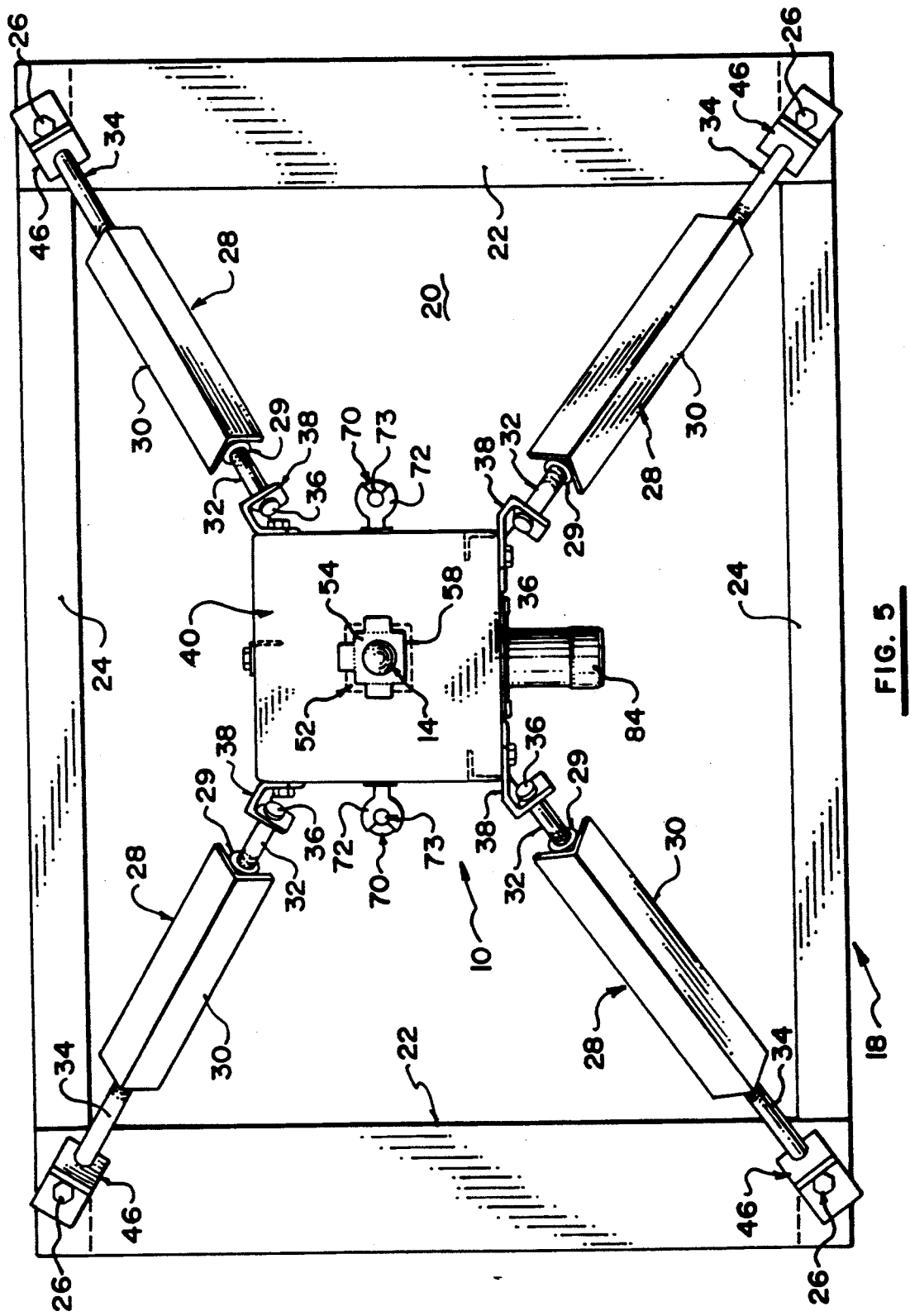
FIG. 5 is a top plan view of the apparatus.

Referring initially to FIGS. 1 and 5, apparatus 10 is attached to the trunk compartment 16 by means of square frame 18. As best seen in FIG. 5, frame 18 is generally rectangular in shape and is rigidly attached to trunk floor 20 by means of bolts or the like (not shown). Frame 18 is made up of a pair of parallel spaced longitudinal members 22 connected at each end by a pair of parallel, spaced transverse members 24.

Figure 10:
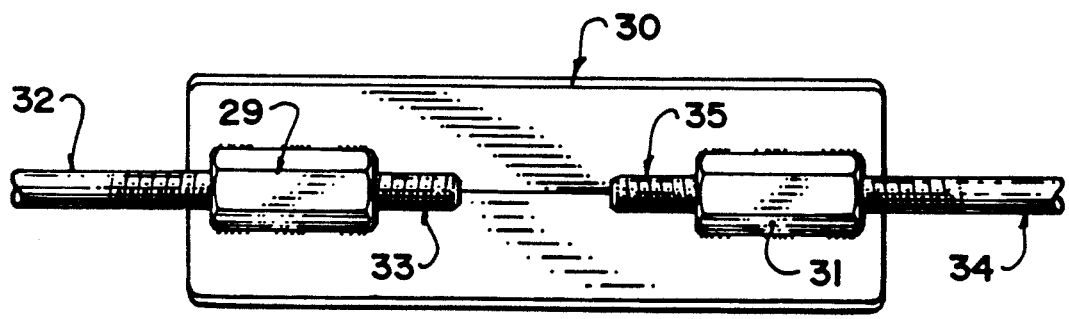
FIG. 10 is a plan view of a leg.

Trunk support apparatus 10 is attached to frame 18 by means of bolts 26. As seen best in FIG. 5, apparatus 10 is connected adjacent the four corners of frame 18 by means of bolts 26. Four legs 28 extend upwardly and inwardly from frame 18. As seen in FIG. 10, legs 28 comprise central angle iron 30 to which an upper nut means 29 (see also FIG. 5) and lower nut means 31 (see also FIG. 1) are attached. Upper nut means 29 is left-hand threaded and lower nut means 31 is right-hand threaded. Upper shaft 32 has a left-hand threaded bolt end at its lower end 33 to mate with the left-hand thread of upper nut means 29. Lower shaft 34 has a right-hand threaded bolt end at its upper end 35 to mate with the right-hand thread of the lower nut means 31. The upper ends 36 of upper shafts 32 are attached to platform mounting flanges 38. Flanges 38 are attached to platform 40 by bolts 42. Lower ends 44 (FIG. 1) of lower shaft 34 are attached to frame mounting flanges 46. Flanges 46 are attached to frame 18 by bolts 26.

It is readily apparent that the distance between ends 36 and 44 may be adjusted by rotational movement of angle iron 30, thereby raising or lowering platform 40 with respect to frame 18. This permits proper positioning of platform 40 in trunk compartment 16 with respect to trunk lid 48 for a variety of motor vehicles having a variety of distances between trunk floor 20 and trunk lid 48.

Figure 2:
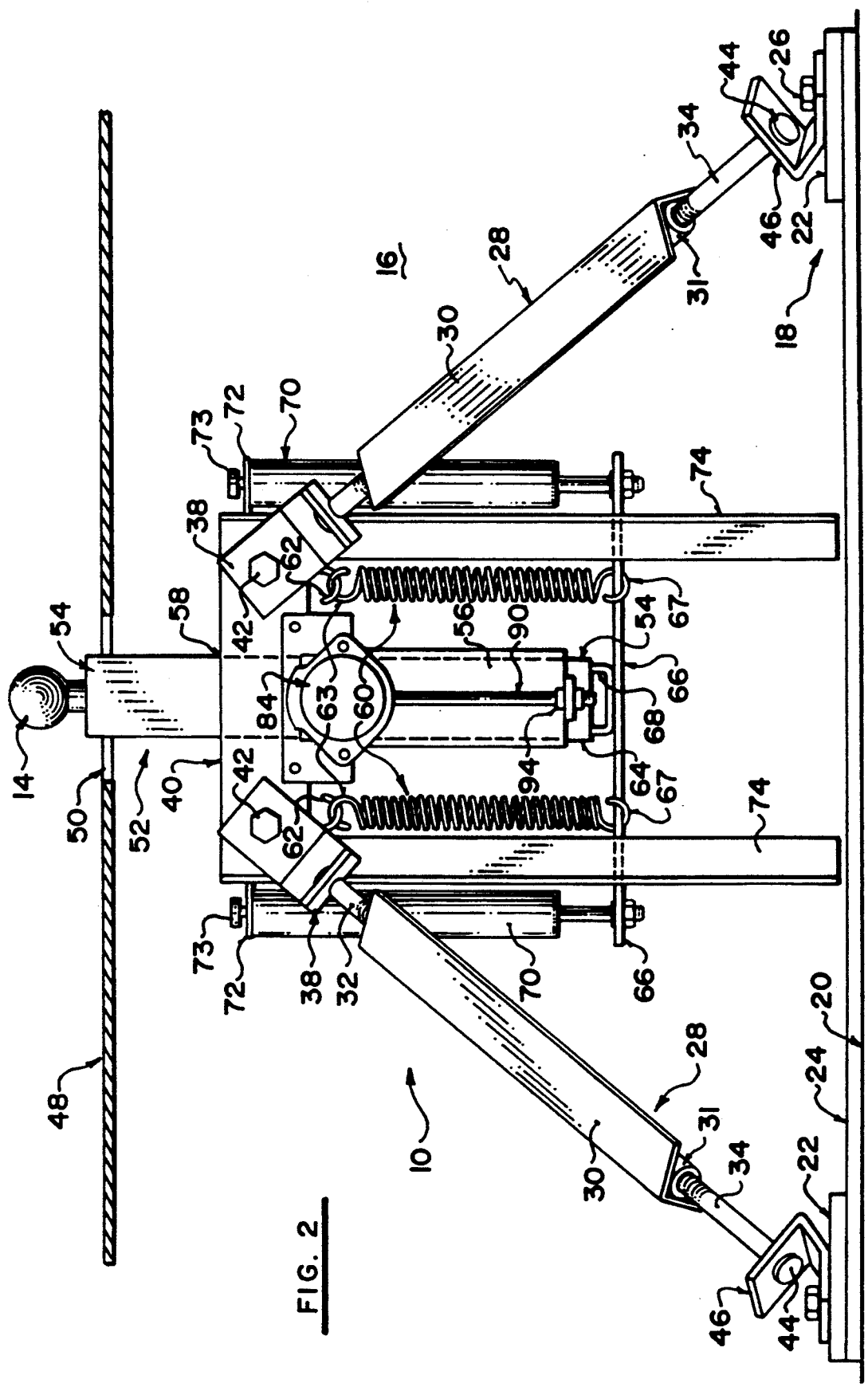
FIG. 2 is a side elevation of the means in the raised position.

Referring now to FIGS. 1 and 2, hitch ball 14 is movable between a retracted, lower position as shown in FIG. 1 and an extended, raised position as shown in FIG. 2. When in the retracted position legs 28 are adjusted in length so that ball 14 is generally just below lid 48. Frame 18 is attached to trunk floor 20 in a position such that ball 14 is positioned generally coaxial with round opening 50 when legs 28 are attached to frame 18.

Hitch ball mechanism 52 comprises extension member 54 with hitch ball 14 attached at the upper end of extension member 54. Member 54 is slideably housed within conduit 56 which is attached to the underside of platform 40 and extends laterally therefrom. Platform 40 has an opening 58 which is colinear with the conduit opening thereby permitting member 54 to slide through platform 40. Extension member 54 is of an appropriate length to permit extension of hitch ball 14 to a position above trunk lid 48, as shown in FIG. 2.

Mechanism 52 is biased to the extended position by springs 60 which act as hitch ball mechanism biasing means. Springs 60 have hook-shaped upper ends 63 which are attached to platform 40 by means of hooks 62 attached to and extending below platform 40. Springs 60 are attached to lower end 64 of extension member 54 by means of lateral rod 66 extending below and lateral to longitudinal axis of member 54. Lateral rod 66 has openings (not shown) for receiving hook-shaped lower ends 67 of springs 60. Rod 66 is attached to c-shaped lower extension rod 68 attached to lower end 64 of extension member 54.

In order to dampen movement of mechanism 52, dampeners 70 are provided at each end of rod 66. Dampeners 70 act as dampening means to dampen movement of mechanism 52. Dampeners 70 are attached at an upper end to platform 40 by means of c-shaped flange 72. Dampeners 70 are attached at a lower end to rod 66 by means of openings (not shown) in rod 66 which receive and secure dampener 70 lower end therein. Dampeners 70 may be a conventional air resistance door closing dampening means. The dampening effect of dampeners 70 may be adjusted by dampener adjustment screw 73.

Three temporary support struts 74 are attached to and extend laterally at right angles below platform 40. Struts 74 act as temporary support of apparatus 10 when being mounted or dismounted from trunk compartment 16. Struts 74 are in triangular orientation and support apparatus 10 when legs 28 are not attached to frame 18, thereby facilitating removal or placement of apparatus 10 from or in trunk compartment 16. When apparatus 10 is properly positioned and supported by legs 28, struts 74 are positioned above trunk floor 20 and do not support apparatus 10.

Figure 3:
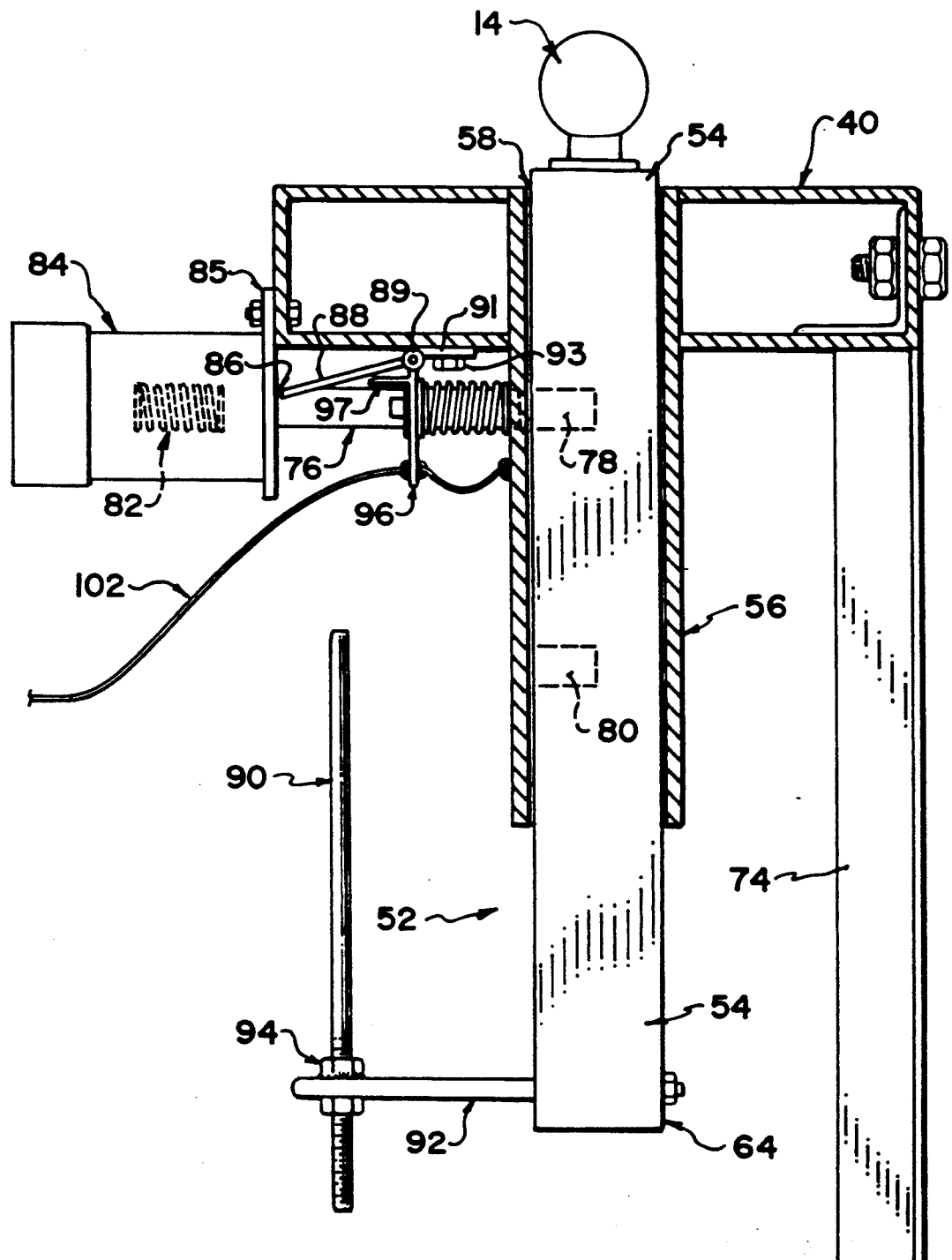
FIG. 3 is a close-up view of the latch mechanism in its retracted position, with the mechanism in the lowered position.
Figure 4:
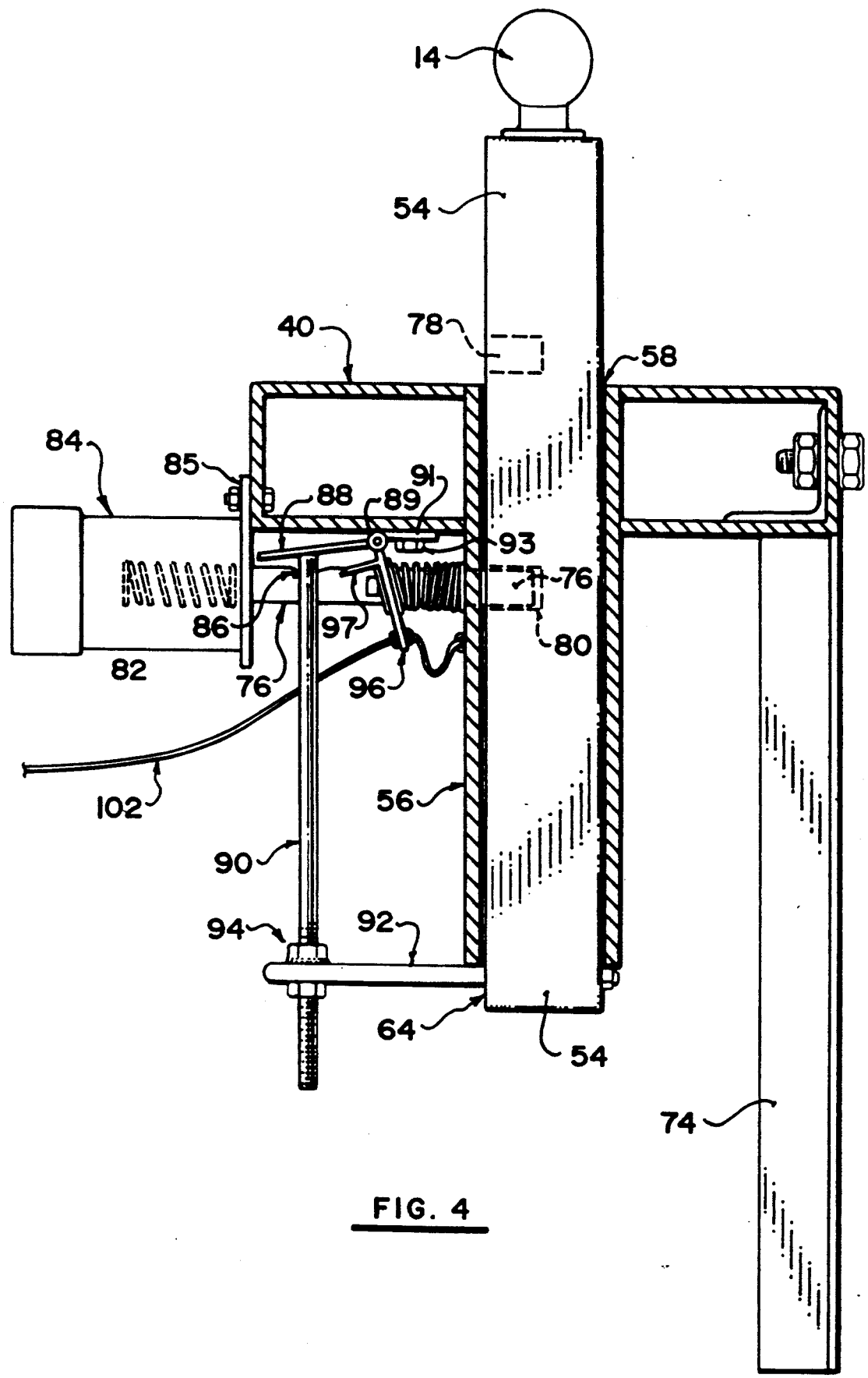
FIG. 4 is a side close-up view of the latch mechanism in its extended position, with the mechanism in the raised position.
Figure 7:
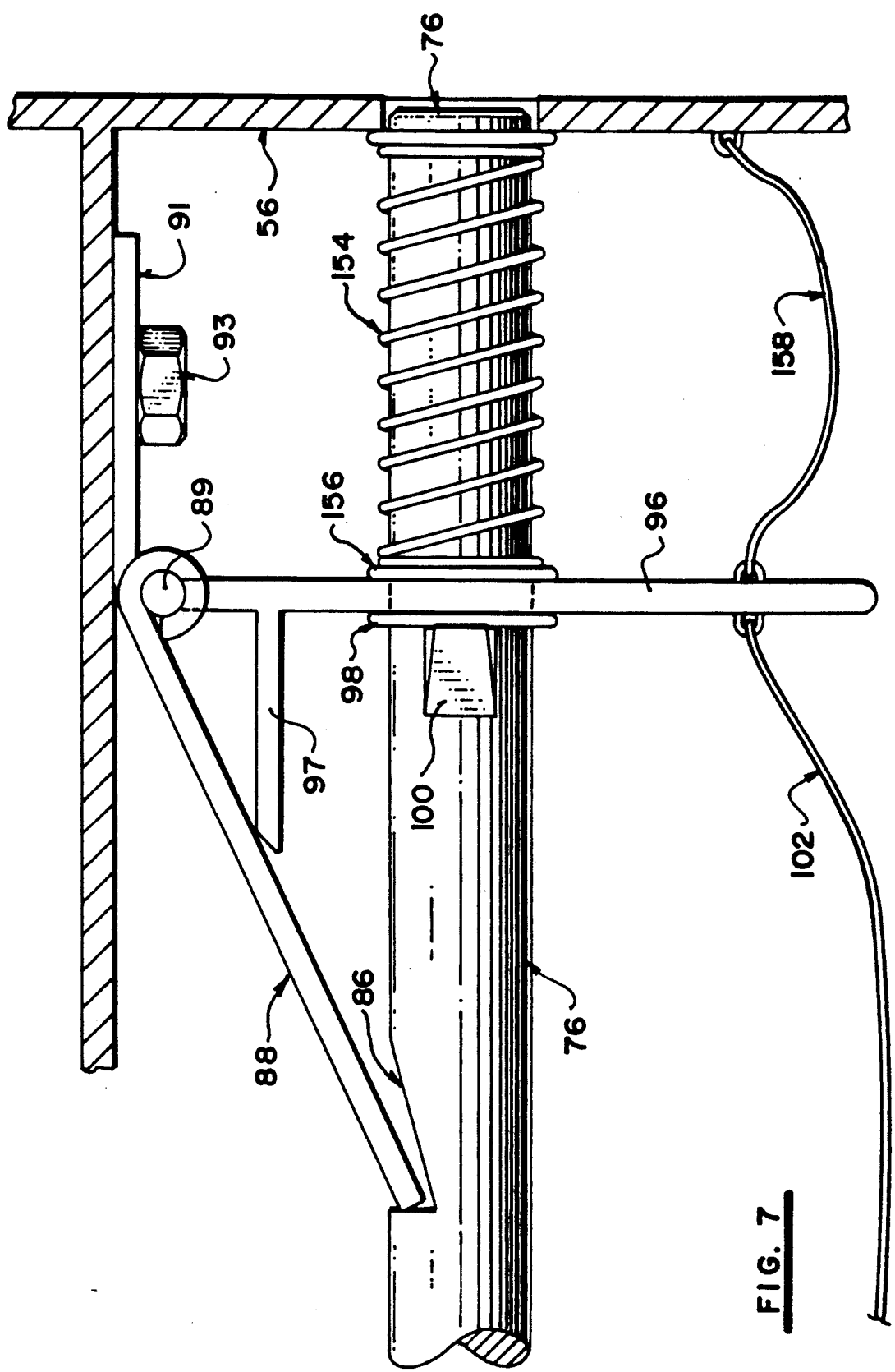
FIG. 7 is a close-up view of the pin in its retracted position.
Figure 8:
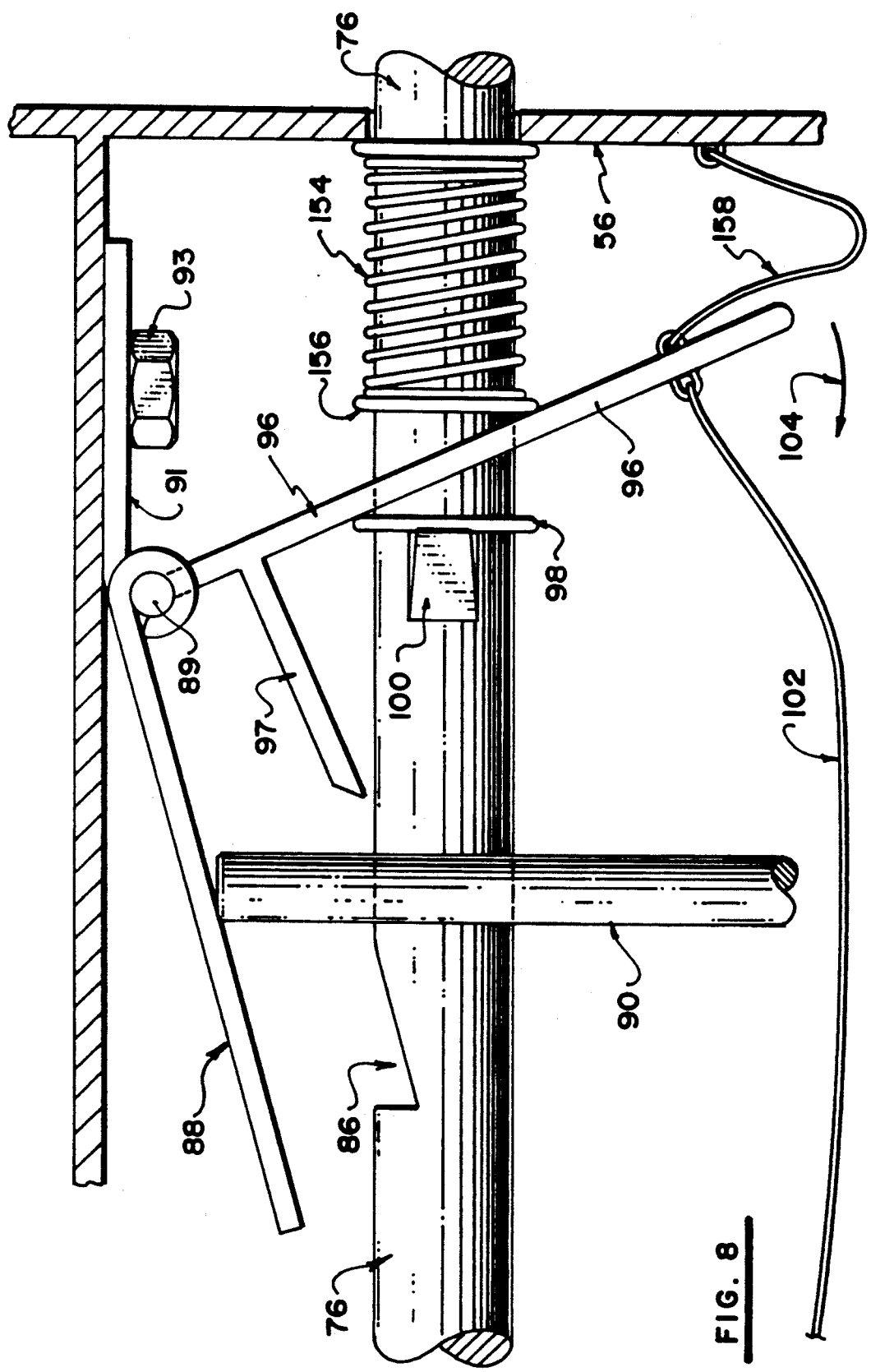
FIG. 8 is a close-up view of the pin in its extended position.
Figure 9:
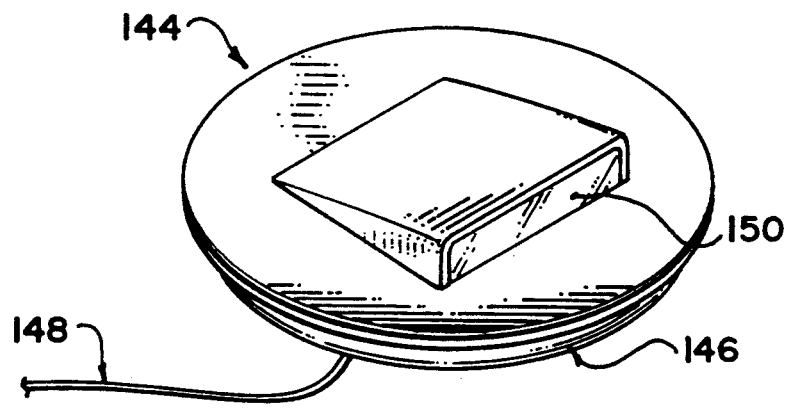
FIG. 9 is a perspective view of the brake light cap.

The extended and retracted position securing means will now be discussed with reference to FIGS. 3 and 4 and the close-up views in FIGS. 7 and 8. Mechanism 52 is shown in its retracted position in FIGS. 3 and 7 and in its extended position in FIGS. 4 and 8. Mechanism 52 is secured in its retracted position by means of movable pin 76 which is movable in a direction lateral to the longitudinal axis of extension 54. When mechanism 52 is in the extended position, retracted position slot 78, which is a lateral opening in extension 54, aligns with pin 76. Pin 76 extends into slot 78 to secure mechanism 52 in the retracted position.

Similarly, mechanism 52 is secured in its extended position by means of pin 76 extending into extended position round slot 80. Pin 76 aligns with slot 80 when mechanism 52 is in its extended position. Pin 76 is shown in its retracted position, wherein pin 76 is retracted from slot 78, in FIG. 3 and in its extended position, wherein pin 76 extends into slot 80, in FIG. 4.

Pin 76 includes spring 82 located in solenoid 84 which acts as pin biasing means to bias pin 76 in the direction of extension 54 and into slots 78 and 80, when said slots are aligned with pin 76. Pin 76 is retracted from slots 78 and 80, against the bias of spring 82 by solenoid 84 which is electrically operated using the power system of the motor vehicle. Solenoid 84 is attached to platform 40 by flange 85. Solenoid 84 may also include a solenoid actuating means (not shown) to activate the solenoid to move pin into its retracted position. The solenoid actuating means may be located remote of trunk compartment 16 and attached to solenoid 84 by a wire (not shown), to facilitate activation of solenoid 84 when trunk lid 48 is closed.

Pin 76 is retained in the retracted position against the bias of spring 82, by means of slot 86 in pin 76 which mates with slot extension 88 hingedly attached to platform 40 at hinge 89. Horizontal extension 91 connected to hinge 89 is attached to the underside of platform 40 with bolt 93. Extension 88 is gravity activated to lower into slot 86 when pin 76 is in its retracted position, to prevent extensional movement of pin 76.

Extension 88 may be raised and removed from slot 86 to permit spring 82 to bias or move pin 76 toward extension 54 and into one of slots 78 or 80 when aligned, in two alternative ways.

Firstly, extension 88 is automatically raised from slot 86 when mechanism 52 moves from the retracted position to the extended position. Rod 90 is attached vertically to extension member 54 by means of horizontal connecting member 92 attached to rod 90 by connector 94. Rod 90 extends vertically upwardly from connector 94 and is aligned to contact the underside of slot extension 88. Rod 90 is of pre-determined length such that slot extension 88 is lifted out of slot 86 when slot 80 is aligned with pin 76. This is best seen in FIG. 4 where rod 90 is shown lifting extension 88 to a generally horizontal position about hinge 89. As previously discussed, the movement of extension 88 from slot 86 permits spring 82 to bias pin 76 into slot 80, thereby securing hitch ball mechanism 52 into its extended position (shown in FIGS. 2 and 4).

The second means of raising extension 88 from slot 86 is by use of vertical extension 96 which is hingedly connected to platform 40 at hinge 89. Movement of extension 96 in the direction of arrow 104 (FIG. 8) will cause lateral extension member 97 to contact slot extension 88 moving extension 88 upwards and out of slot 86. Extension 96 includes cable member 102 attached to extension 96 at one end. The other end of cable 102 may be attached at a convenient location, preferably accessible from the outside of the trunk compartment. Cable 102 is pullable by a user to manually move extension 96 in the direction of arrow 104 (FIG. 8). When this occurs, slot extension 88 will move in a corresponding upward movement from slot 86 thereby releasing pin 76 and permitting biasing action of spring 82 to move pin 76 towards member 54.

Extension 96 has an elongated opening (not shown) through which pin 76 extends. Washer 98 is held in place by key 100 which forms a lateral extension from pin 76 on the side of washer 98 closest to solenoid 84. Washer 98 is located on the side of extension 96 opposite to member 54 and contacts extension 96. Washer 98 contacts key 100 and moves pin 76 to its retracted position on movement of extension 96 in the direction of arrow 104.

Spring 154 encircles pin 76 between extension 96 and conduit 56. The end of spring 154 adjacent extension 96 is attached to washer 156 which contacts extension 96. Spring 154 acts to restrict movement of extension 96 to hold extension 96 and to bias extension 96 against washer 98. This also biases washer 98 against key 100.

Pulling action on cable member 102 and movement of extension 96 in the direction of arrow 104 (FIG. 8) will also put pressure on washer 98 toward solenoid 84 and corresponding pressure on key 100, thereby moving pin 76 against bias of spring 82 into the retracted position whereupon slot extension 88 will drop through force of gravity into slot 86 thereby securing pin 76 into its retracted position. When pin 76 is in its extended position extension 91 is moved by washer 98 to a position angled from the vertical as shown generally in FIG. 8. When pin 76 is moved to its retracted position the force of gravity will move extension 96 back to a vertical position. Cable 158 connects extension 96 to conduit 56 and has sufficient slack to permit movement of extension 88 from slot 86 when extension 96 is pulled by cable 102. Cable 158 prevents the user from moving extension 96 to an excessive degree and prevents damage to extension 96.

Cable 102 may be used instead of solenoid 84 at any time, and particularly in case of power interruption or malfunction of the solenoid, to ensure that pin 76 may be retracted from extension 54 so that mechanism 52 may be moved from its retracted to its extended position, and vice versa, as needed by the user.

Coupler

Referring to FIG. 6, a coupling means 12 acts as a coupler device and is used to attach male end coupling mechanism 108 of a fifth wheel type trailer to hitch ball 14 for rotation about the circumference of hitch ball 14. Coupling means 12 comprises three basic components; coupler 110, split collar 112 and ring member 114.

Split collar 112 has two semi-circular components 118 that mate to encircle the intermediate narrow protrusion portion 116 of male end 108. Split collar 112 has screw threads (not shown) on the outer surface which align upon mating of the two semi-circular components 118.

Coupler 110 has a generally tubular end 120 which has a sufficient cross-sectional diameter to encircle annular ring portion 122 of male end 108 and to encircle split collar 112. End 120 has screw threads (not shown) on its inner face which mate with the screw threads on collar 112. End 120 is thereby attachable to collar 112 to secure coupler 110 to male end 108.

Ball end 124 is on the opposite end of coupler 110 from end 120. Ball end 124 includes inner side 126 forming a zone of a sphere for mating with a portion of a first hemisphere 128 of hitch ball 14. The outer face 130 of ball end 124 is generally tubular in shape and has screw threads thereon.

Ring member 114 is positioned between hitch ball 14 and extension 54. The inner diameter of member 114 is smaller than the diameter of ball 14 and cannot be raised over ball 14 when ball 14 is attached to extension 54. Ring member 112 includes inner side 132 which forms a zone of a sphere for mating with a second hemisphere 134 of ball 14. Ring member 114 includes lateral tubular extension 136 which extends about the outer face 130 of ball end 124. The inner side 138 of extension 136 includes screw threads (not shown) which mate with the screw threads on face 130 and attach ring member 114 to coupler 110 and which permit rotational movement of coupler 110 about ball 14 against sides 126 and 132. Ball 14 is thereby rotatably attached to male end 108.

Referring to FIG. 10, brake light housing 144 has a circular rubber gasket 146 which may be tightly placed in opening 50 to seal opening 50 from the elements. Brake light power cable 148 extends into trunk compartment 16 and may be connected to the brake light system of the vehicle. In this way the brake light 150 may be activated concurrent with the brake lights on the vehicle.

In order to seal opening 50 when a trailer is coupled to the motor vehicle, gasket 142 (FIG. 6) may be placed about the periphery of coupler 110. The top of gasket 142 may be fitted to engage flange 152 of coupler 110. The bottom of gasket 142 encircles the outer periphery of opening 50. When mechanism 52 is moved to its lower position, pressure is placed on gasket 142 by flange 152 to seal opening 50.

Operation

The procedure to couple a fifth wheel type trailer to an automobile having a trunk compartment will now be discussed. The automobile is first modified to accommodate the installation of apparatus 10 in the trunk compartment. Frame 18 is positioned in trunk compartment 16 so that members 22 are adjacent the frame of the vehicle or some other adequate support structure located on the vehicle. Transverse members 24 are positioned and attached to members 22. Members 22 are rigidly attached to the frame or other suitable support structure of the motor vehicle.

A circular opening 50 is cut into trunk lid 48 at a position generally coaxial with the position of ball 14 in trunk compartment 16. Opening 50 is of sufficient diameter to permit unimpeded movement of coupling means 12 about ball 14, when a trailer is coupled to ball 14.

Apparatus 10 is positioned in trunk compartment 16 so that ball 14 is generally in coaxial vertical alignment with opening 50. Struts 74 support apparatus 10 temporarily. Legs 28 are adjusted in length by turning angle iron 30 as discussed previously until bolt holes in flanges 46 are aligned with bolt holes (not shown) in frame 18. Bolts 26 are then used to secure legs 28 to frame 18. Legs 28 are then adjusted to raise apparatus 10 until struts 74 no longer support apparatus 10 and until platform 40 is generally horizontal. Legs 28 are further adjusted to position ball 14 just below the plane of trunk 48 lid when mechanism 52 is in its lowered position.

Solenoid actuating means (not shown) is connected to solenoid 84 by means of appropriate electrical wire (not shown). Cable 102 is also attached to extension 91 at one end and extends remote of trunk compartment 16 at the other end. Cable 102 and solenoid actuating means (not shown) may be conveniently located in the rear license plate enclosure on the outside of the motor vehicle or even behind the rear license plate on those motor vehicles in which the rear license plate is hinged to provide access to the gasoline tank inlet (not shown).

The trunk lid is then closed and solenoid actuating means (not shown) is actuated by the user to activate solenoid 84 to retract pin 76 from slot 78; mechanism 52 being in its retracted position. Extension 88 then engages slot 86 to hold pin 76 in its retracted position. Springs 60 force mechanism 52 up to its extended position wherein ball 14 extends through opening 50 above the plane of trunk lid 48. Rod 90 then moves extension 88 upwardly out of slot 86 and spring 82 moves pin 76 into slot 80 which is then aligned with pin 76. Mechanism 52 is then secured in its extended position with ball 14 exposed on the outside of trunk compartment 16. The automobile is then positioned so that ball 14 is just below male end 108 of a conventional fifth wheel trailer hitch.

Coupling means 12 is connected to male end 108 as follows. Split collar portions 118 are placed about the circumference of protrusion 116 adjacent portion 122 and are mated to align screw threads to form collar 112. Tubular end 120 of coupler 110 is then screwed onto collar 112 to sandwich portion 122 between collar 112 and coupler 110. The trailer is then lowered so that inner side 126 of ball end 124 rests on ball 14. Ring member 114 which is located between ball 14 and extension member 54 when not in use, is raised and screwed onto ball end 124 of coupler 110 thereby sandwiching ball 14 between coupler 110 and ring member 114 and permitting rotational movement of faces 126 and 132 about ball 14. Set screw 140 is then screwed through ring tubular extension 136 into opening 137 of side 130 of coupler 110 thereby securing ring member 114 to coupler 110.

The solenoid actuating means (not shown) is then engaged to cause solenoid 84 to remove pin 76 from slot 80. Extension 88 drops into slot 86 to hold pin in its retracted position. Downward pressure is then placed on mechanism 52 by the weight of the trailer and also, if necessary, by the user to force mechanism 52 to its retracted position against the bias of springs 60. Cable 102 is then pulled to cause extension 96 to be moved in the direction of arrow 104 thereby moving extension 88 upwardly out of slot 86. Once extension 88 is removed from slot 86, spring 82 pushes pin 76 toward extension 54. When slot 78 is aligned with pin 76, spring 82 pushes pin 76 into slot 78 thereby securing mechanism 52 in its retracted position. This pulls the front end of the trailer downward to a proper orientation for towing and lowers the center of gravity of the coupler with respect to the vehicle to facilitate towing of the trailer.

Optionally, before lowering mechanism 52 into its retracted position, gasket 142 (FIG. 6) may be placed about the periphery of opening 50. The top of gasket 142 engages flange 152 of coupler 110. The bottom of gasket 142 encircles the outer periphery of opening 50. Flange 144 puts slight downward pressure on gasket 142 when mechanism 52 is in its lowered position, thereby sealing opening 50 and coupling means 12 inside gasket 142 to protect these components from the elements and to seal trunk compartment 16.

The trailer is then pulled by the motor vehicle to an appropriate destination. When the user desires to uncouple the trailer from the motor vehicle, solenoid actuating means (not shown) is activated causing solenoid 84 to move pin 76 from slot 78. Springs 60, with upward pressure applied by the user on the trailer, if necessary, move mechanism 52 to its extended position thereby exposing the coupling means 12 above the trunk lid. Pin 76 is automatically released to engage in slot 80 by rod 90 in the manner previously discussed. Gasket 142 is removed and set screw 140 loosened. Ring member 114 is screwed off coupler 110 and ring member 114 is allowed to rest on platform 40 and extension member 54. The trailer is then raised, which lifts coupler 110 from ball 14. Coupler 110 may then be unscrewed from collar 112 and split collar 112 separated and removed from male end 108.

Pin 76 may then be moved manually from slot 80 by pulling pressure on cable 102 which moves extension 96 in the direction of solenoid 84 moving washer 98 towards solenoid 84 and pin 76 out of slot 80. Alternatively, solenoid 84 may be actuated by solenoid actuating means (not shown) to move pin 76 from slot 80. Downward pressure may then be applied by the user to move mechanism 52 to its retracted position. Cable 102 may be pulled to cause extension 97 to contact and release extension 88 from slot 86 to permit spring 82 to bias pin 76 towards extension member 54. When pin 76 aligns with slot 78, spring 82 pushes pin 76 into slot 78 and mechanism 52 is secured in its lower position.

Brake light housing 144, having circular rubber gasket 146, may then be secured in opening 50 with the said rubber gasket forming a watertight seal enclosing opening 50. Brake light power cable 148 connected to the brake light may then be connected to the brake light system of the vehicle to activate brake light 144 in conjunction with the brake lights on the vehicle. Alternatively, a housing with a similar circular rubber gasket, but without a brake light thereon, may be used if a brake light is not desired. The vehicle may then be moved independent of the trailer with the trunk compartment sealed from the elements.

I claim:

1. A fifth wheel trailer hitch apparatus for attaching the coupling mechanism of a fifth wheel type trailer to the trunk compartment of a passenger-type motor vehicle, said motor vehicle having a trunk lid to enclose the trunk compartment and said trunk lid having an opening therethrough, said hitch apparatus comprising:
   a. a support attachable to said trunk compartment;
   b. a platform connected to and supported by said support;
   c. a hitch ball mechanism comprising a hitch ball attached to an extension member slideably communicating with said platform for movement of said mechanism between a retracted, lower position and an extended, raised position, said hitch ball positionable below the trunk lid when in the retracted position and positionable above the trunk lid, and extending through the opening, when in the extended position;
   d. extended position securing means for securing said mechanism in the extended position;
   e. retracted position securing means for securing said mechanism in the retracted position;
   f. coupling means for coupling said coupling mechanism of said trailer to said hitch ball.

2. An apparatus as described in claim 1, further comprising hitch ball mechanism biasing means for biasing said mechanism to said extended position.

3. An apparatus as described in claim 1 wherein said coupling means comprises:
   a. a coupler securable to the fifth wheel coupling mechanism comprising an outwardly extending conduit with an inner spherical face forming a zone of a sphere for mating with a portion of a first hemisphere of said hitch ball; and
   b. a ring member connected to said hitch ball having an inner spherical face forming a zone of a sphere for mating with a portion of a second hemisphere of said hitch ball, said ring member attachable to said coupler thereby sandwiching said ball between said ring member and said coupler and permitting said hitch ball to rotate therebetween.

4. An apparatus as described in claim 3, wherein said coupling mechanism of the fifth wheel type trailer has a male end with an intermediate narrow protrusion portion and an annular ring portion extending laterally from the protrusion portion, further comprising:
   a. an annular collar split into two portions, said collar mating with said intermediate narrow protrusion portion adjacent said annular ring portion; and
   b. collar attaching means for attaching said collar to said coupler to sandwich said annular ring portion between said collar and said coupler.

5. An apparatus as described in claim 3 wherein said ring member is attachable to said hitch ball by means of screw threads on said ring member which mate with screw threads on said coupler.

6. An apparatus as described in claim 1 wherein said extended position securing means comprises an extendable pin connected to said platform and a corresponding extended position slot in said extension member for receiving said pin when said mechanism is in said extended position.

7. An apparatus as described in claim 6 wherein said retracted position securing means comprises a retracted position slot in said extension member for receiving said pin when said mechanism is in said retracted position.

8. An apparatus as described in claims 6 or 7 further comprising pin moving means for moving said pin out of said extended position slot and said retracted position slot.

9. An apparatus as described in claims 6 or 7 wherein said pin moving means comprises a solenoid switch attached to said pin.

10. An apparatus as described in claim 8 further comprising pin moving actuating means for actuating said pin moving means.

11. An apparatus as described in claim 10 wherein said pin moving actuating means is located remote of said trunk compartment.

12. An apparatus as described in claim 6 wherein said pin includes pin biasing means for biasing said pin toward said slot.

13. An apparatus as described in claim 12 further comprising pin engaging means for engaging said pin against the bias of said biasing means when said pin has been moved a pre-determined distance from the slot.

14. An apparatus as described in claim 13 further comprising pin actuating means for disengaging said pin engaging means and permitting said pin biasing means to bias said pin towards said slot.

15. An apparatus as described in claim 14, wherein said pin actuating means is located remote of said trunk compartment.

16. An apparatus as described in claim 14 wherein said pin actuating means is connected to said extension member to disengage said pin engaging means when said extended position slot in said extension member is aligned with said pin.

17. An apparatus as described in claim 1 further comprising covering means for covering said opening.

18. An apparatus as described in claim 17 wherein said covering means comprises a brake light connected to the brake light system of the motor vehicle.

19. An apparatus as described in claim 1 further comprising temporary supporting means for supporting said platform during installation or removal of said platform.

20. An apparatus as described in claim 1 wherein said support is adjustable in length to permit upward and downward movement of said platform with respect to said trunk compartment.

21. An apparatus as described in claim 20 wherein said support is comprised of four legs extending generally laterally from said platform.

22. An apparatus as described in claim 1 further comprising a frame connected to the trunk compartment of said vehicle and to the outer ends of said support.

23. An apparatus as described in claim 22 wherein said frame is generally of narrow cross-section to permit substantial use of said trunk compartment when said support, platform, hitch ball mechanism, extended position securing means, retracted position securing means and coupling means are removed from said trunk compartment.

24. An apparatus as described in claim 1 further comprising releasing means for releasing said extended position securing means and said retracted position securing means.

25. An apparatus as described in claim 2 further comprising dampening means for dampening action of said hitch ball mechanism when biased to said extended position by said biasing means.

26. An apparatus as described in claim 1 further comprising mechanism securing means for securing said mechanism in any position between said extended position and said retracted position.

27. An apparatus for coupling a fifth wheel male end to a trailer hitch ball, said male end having an intermediate narrow protrusion portion with an annular ring portion extending laterally therefrom, said apparatus comprising:
  a. an annular collar split into two portions, said collar matable with said intermediate narrow protrusion portion adjacent said annular ring portion;
  b. a coupler having a tubular end for encircling a portion of said annular collar and an opposed ball end having an inner side forming a zone of a sphere for mating with a portion of a first hemisphere of said ball;
  c. collar attaching means for attaching said collar to said tubular end of said coupler thereby sandwiching said annular ring portion between the collar and the tubular end;
  d. an annular ring member having an inner side forming a zone of a sphere for mating with a portion of a second hemisphere of said ball;
  e. ring attaching means for attaching said annular ring member to said ball and thereby sandwiching said ball between said ring member and said ball end and permitting said ball to rotate therebetween.

28. An apparatus as described in claim 27 further comprising securing means for securing said attaching member to said annular ring member.

29. An apparatus as described in claim 28 wherein said collar attaching means comprises a thread portion on the outer side of said annular collar and a thread portion mating with said first thread portion on the inner face of said tubular end of said coupler.

30. An apparatus as described in claim 29 wherein said securing means comprises a set screw extending through said collar attaching means to thread against said annular collar.

31. An apparatus as described in claim 30 wherein said ring attaching means comprises a thread portion on the outer face of said ball end of said coupler and a matching thread portion on the outer face of said annular ring member.

32. An apparatus as described in claim 31 further comprising securing means for securing said annular ring member to said ball end.

33. An apparatus as described in claim 31 wherein said securing means is a set screw extending through said ball end against said annular ring member.

34. An apparatus as described in claim 27 wherein said collar is split into two semi-circular portions.

* * * * *